United States Patent [19]
Robinson

[11] Patent Number: 5,542,011
[45] Date of Patent: Jul. 30, 1996

[54] OPTICAL AMPLIFIERS

[75] Inventor: Andrew N. Robinson, Bishop's Stortford, England

[73] Assignee: Northern Telecom Limited, Montreal, Canada

[21] Appl. No.: 303,367

[22] Filed: Sep. 9, 1994

[30] Foreign Application Priority Data

Sep. 9, 1993 [GB] United Kingdom ............... 9318688

[51] Int. Cl.⁶ .................................................. G02B 6/26
[52] U.S. Cl. ................................................ 385/24; 372/6
[58] Field of Search .............................. 385/24, 141, 142, 385/144; 372/6, 71

[56] References Cited

U.S. PATENT DOCUMENTS

| | | | |
|---|---|---|---|
| 5,058,974 | 10/1991 | Mollenauer | 372/6 |
| 5,111,334 | 5/1992 | Heidemann | 372/6 |
| 5,131,069 | 7/1992 | Hall | 385/142 |
| 5,218,608 | 6/1993 | Aoki | 372/6 |
| 5,224,116 | 6/1993 | Whitley et al. | 372/6 |

FOREIGN PATENT DOCUMENTS

| | | |
|---|---|---|
| 0459685 | 12/1991 | European Pat. Off. . |
| 0522201 | 2/1992 | European Pat. Off. . |
| 0470497 | 1/1993 | European Pat. Off. . |
| 0567941 | 11/1993 | European Pat. Off. . |
| 0603925 | 6/1994 | European Pat. Off. . |
| 2266620 | 11/1993 | United Kingdom . |
| 94/05061 | 3/1994 | WIPO . |

*Primary Examiner*—John Ngo
*Attorney, Agent, or Firm*—Lee, Mann, Smith, McWilliams, Sweeney & Ohlson

[57] ABSTRACT

In a co- and counter-pumped optically pumped optical amplifier configuration using two lasers as the pumps, the possibility of the formation of a coupled laser cavity is pre-empted by embedding a signal/pump wavelength multiplexing coupler in the amplifier fibre.

8 Claims, 1 Drawing Sheet

OPTICAL AMPLIFIERS

BACKGROUND OF THE INVENTION

This invention relates to optical amplifiers employing optically pumped optically amplifying waveguide, typically optically amplifying optical fibre. One of the known types of optical amplifier fibre is erbium doped optical fibre, and it is known that this can be pumped at 1480 nm, and at 980 nm, using injection laser diode pumps.

When pumping at 1480 nm, it is known to use a dual pump configuration in which one pump laser is coupled to one end of the amplifier fibre by means of a pump/signal wavelength multiplexing 2×2 coupler in co-pumping configuration, while the other pump laser is similarly coupled to the other end in counter-pumping configuration. For a number of applications it would be preferable to arrange to pump at 980 nm instead of 1480 nm. This may for instance be because of the greater electrical to optical conversion efficiency of amplifiers pumped at the shorter wavelength. A difficulty is however found in transferring the dual pump configuration, which has proved satisfactory in a system designed for pumping at 1480 nm, directly into a system designed for pumping at 980 nm.

SUMMARY OF THE INVENTION

The present invention is directed to overcoming this difficulty.

According to the present invention there is provided an optical amplifier including a length of optical amplifier waveguide whose two ends are respectively coupled by first and second pump/signal wavelength multiplexing 2×2 couplers with first and second optical pump lasers respectively in co-pumping and counter-pumping configuration with respect to the optical amplifier waveguide, wherein said amplifier waveguide is divided into two portions optically coupled in a manner that is substantially transparent to the signal wavelength and that comprises a third pump/signal wavelength multiplexing 2×2 coupler.

BRIEF DESCRIPTION OF THE DRAWINGS

There follows a description of an optical amplifier embodying the invention in a preferred form. This description is prefaced with further description of a prior art optical amplifier in order to set the invention in context. The description refers to the accompanying drawings in which.

DETAILED DESCRIPTION OF THE PREFERRED EMBODIMENT

Figure 1:
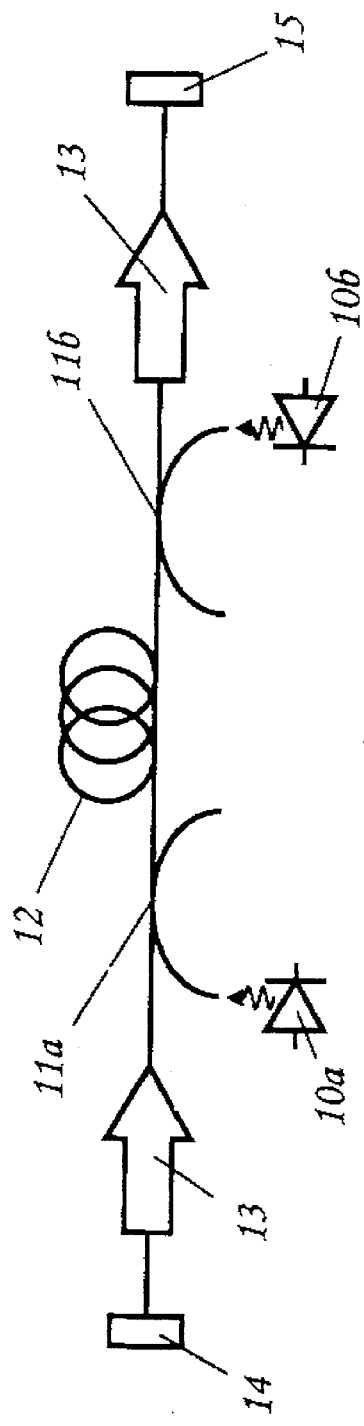
FIG. 1 is a diagram of a prior art amplifier.

Referring first to FIG. 1, a prior art form of dual pumped erbium doped optical amplifier designed for operation with pumping at 1480 nm has two injection laser diode pumps 10a and 10b, two pump/signal wavelength multiplexing 2×2 couplers 11a and 11b, a length 12 of erbium doped optical amplifier fibre, two optical isolators 13, and input and output terminals 14 and 15.

The two pump laser 10a and 10b are optically coupled via the amplifier fibre 12 and the multiplexing couplers 11a and 11b, and so these elements cooperate to form a composite cavity. The two lasers provide optical gain for this composite optical cavity. Because the absorption band of the amplifier fibre 12 extends the full width of the laser's said spectrum, and beyond, the composite cavity does not lase. Accordingly the two lasers 10a and 10b do not act as coupled lasers. Each acts independently of the other.

The situation is significantly different however if the two pump lasers 10a and 10b are replaced by lasers emitting at 980 nm. This is because the absorption band of the amplifier fibre 12 is much narrower at this part of the spectrum, being only about 10 to 15 nm wide. This is narrower than the gain spectrum of the lasers which is about 60 nm. The result is that pump laser Fabry Perot modes of the composite cavity that lie spectrally beyond the fibre's absorption band become dominant.

Confirmation of this effect was observed in an experimental set up. Temperature cycling of the 980 nm pump lasers, in a dual pumped amplifier configuration as depicted in FIG. 1 resulted in the observation of strong mode partitioning behaviour, with no modes being excited within the absorption band of the erbium doped amplifier fibre. By rotating the state of polarisation of the emission of one of the pumps into orthogonality with that of the other, the coupling between the two lasers could be partially uncoupled thereby causing the majority of the emission of both diodes to return to the dominant pump laser mode at 987 nm. However this condition was not a stable one because, in the absence of active control, polarisation orthogonality was lost within a few minutes, due to birefringence drift effects in the amplifier fibre.

Figure 2:
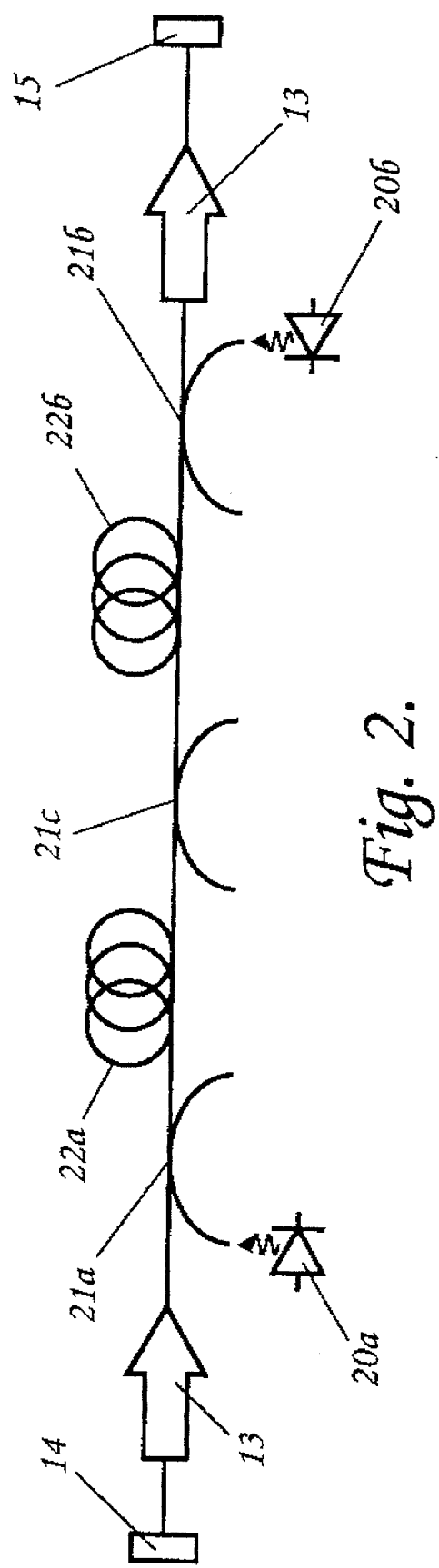
FIG. 2 is a diagram of an amplifier embodying the present invention.

These problems are avoided in the configuration of amplifier depicted in FIG. 2. In this configuration there are two 980 nm injection laser diode pumps 20a and 20b, and three (instead of two) pump/signal wavelength multiplexing 2×2 couplers 21a, 21b and 21c. The extra multiplexing coupler 21c is embedded in the amplifier, dividing it into two parts 22a and 22b. The isolators 13 and input and output terminals 14 and 15 are identical with their counterparts in the amplifier configuration of FIG. 1.

Pump power from laser 20a is transmitted across multiplexing coupler 21a into the first portion 22a of amplifying fibre, but is prevented from being launched into the second portion 22b by the operation of multiplexing coupler 21c. Accordingly there is no pump power from laser 20a propagating in portion 22b of the amplifier fibre to be transmitted by multiplexing coupler 21b across into laser 20b. Similarly pump power from laser 20b is prevented by multiplexing coupler 21c from reaching laser 20a. It is seen therefore that the presence of the third multiplexing coupler 21c has served to optically decouple the two lasers. On the other hand, the optical coupling between the two parts 22a and 22b of amplifier fibre that is provided by the multiplexing coupler 21c is substantially transparent to signal power.

I claim:

1. An optical amplifier including a length of optical amplifier waveguide whose two ends are respectively coupled by first and second pump/signal wavelength multiplexing 2×2 couplers with first and second optical pump lasers respectively in co-pumping and counter-pumping configuration with respect to the optical amplifier waveguide, wherein said amplifier waveguide is divided into two portions optically coupled in a manner that is substantially transparent to the signal wavelength and that comprises a third pump/signal wavelength multiplexing 2×2 coupler connected to receive optical pump power only by way of the optical amplifier waveguide.

2. An optical amplifier as claimed in claim 1, wherein the optical amplifier waveguide has an absorption that extends over a narrower spectral range than that over which the optical pump lasers emit.

3. An optical amplifier as claimed in claim 2, wherein the optical amplifier waveguide is erbium doped and the pump lasers emit at 980 nm.

4. An optical amplifier as claimed in claim 3, wherein the pump lasers are injection lasers.

5. An optical amplifier as claimed in claim 1, wherein the optical amplifier waveguide is an optical amplifier optical fibre.

6. An optical amplifier as claimed in claim 5, wherein the amplifier fibre has an absorption band that extends over a narrower spectral range than that over which the optical pump lasers emit.

7. An optical amplifier as claimed in claim 6, wherein the amplifier fibre is erbium doped and the pump lasers emit at 980 nm.

8. An optical amplifier as claimed in claim 7, wherein the pump lasers are injection lasers.

* * * * *